Figure 1:
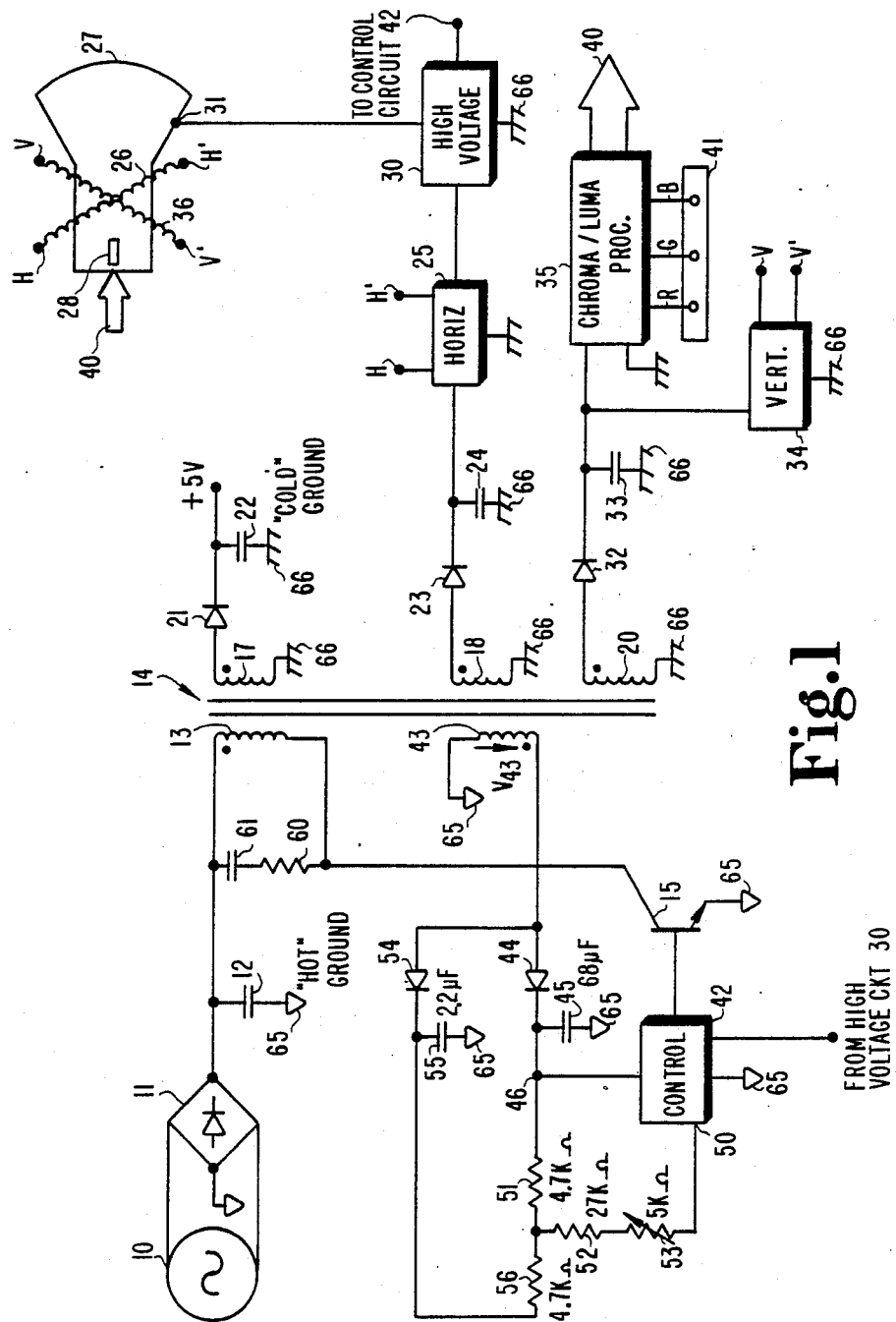

United States Patent [19]
Wharton

[11] Patent Number: 4,658,342
[45] Date of Patent: Apr. 14, 1987

[54] DUAL FEEDBACK SWITCHING POWER SUPPLY REGULATOR FOR ISOLATED CHASSIS

[75] Inventor: James H. Wharton, Indianapolis, Ind.

[73] Assignee: RCA Corporation, Princeton, N.J.

[21] Appl. No.: 793,421

[22] Filed: Oct. 31, 1985

[51] Int. Cl.[4] .......................................... H02M 3/335
[52] U.S. Cl. ..................................... 363/21; 315/411; 363/97
[58] Field of Search ................... 315/411; 363/19, 21, 363/23, 26, 79, 97

[56] References Cited

U.S. PATENT DOCUMENTS

| | | | |
|---|---|---|---|
| 3,388,309 | 6/1968 | Banks et al. | 321/2 |
| 3,419,781 | 12/1968 | Jullien-Davin | 363/21 |
| 4,172,276 | 10/1979 | Kameya | 363/19 |
| 4,266,268 | 5/1981 | Tkacenko | 363/49 |
| 4,488,210 | 12/1984 | Shono | 363/19 |
| 4,525,739 | 6/1985 | Fitzgerald | 358/190 |

FOREIGN PATENT DOCUMENTS

| | | | |
|---|---|---|---|
| 22580 | 2/1983 | Japan | 363/21 |
| 165674 | 9/1983 | Japan | 363/19 |

*Primary Examiner*—William H. Beha, Jr.
*Attorney, Agent, or Firm*—Paul J. Rasmussen; Joseph Laks; Scott J. Stevens

[57] ABSTRACT

A regulating switched mode power supply for a video display apparatus provides electrical isolation between the load circuits and the AC line. A power transformer incorporates a regulator winding referenced to AC line ground potential. First and second feedback circuits develop first and second feedback signal components that are applied to a regulator control circuit which controls the conduction of the power supply switching transistor. The two feedback circuits have different time constants to accurately monitor load circuit loading conditions in order to maintain load circuit voltage level regulation.

13 Claims, 2 Drawing Figures

DUAL FEEDBACK SWITCHING POWER SUPPLY REGULATOR FOR ISOLATED CHASSIS

This invention relates to power supplies for video display apparatus and, in particular, to regulating power supplies that provide circuit isolation.

The power supplies used in video display apparatus, such as television receivers and computer monitors, must provide precise regulated voltage supply levels in order that the load circuits powered by the supplies operate as desired. A typical power supply of the switching type incorporate a transformer having a primary winding and a number of secondary windings, to which the load circuits are connected. A switching device, such as a transistor or a silicon controlled rectifier (SCR), periodically applies a source of unregulated voltage derived from the AC line to the transformer primary winding. Feedback from one of the secondary windings controls the conduction angle of the switching device to provide regulation of the voltages developed across the secondary windings.

When the video display apparatus includes user-accessible input or output terminals, such as individual red, green and blue (RGB) color signal inputs in the case of a computer monitor, electrical isolation must be provided between the user-accessible terminals and the AC line to prevent the possibility of electrical shock. This electrical isolation is defined as an impedance of such a magnitude that the maximum current that can flow between the AC line and the user-accessible terminals will be below a recognized safe level. The previously described electrical isolation is economically provided by isolating the primary "hot" winding and the secondary "cold" windings of the power supply transformer by the use of a predetermined amount of insulating material and sufficient physical separation of the windings.

The use of an isolating transformer, however, prevents the direct use of a "cold" secondary winding feedback to the "hot" switching device for voltage regulation purposes, as previously described. The use of additional isolating components in the feedback path, such as transformers and optocouplers, may undesireably increase the cost and complexity of the circuit. Regulation via a primary side winding of the transformer may not be satisfactory, due to the imperfect coupling between the primary and secondary windings. The isolating transformer exacerbates this problem, due to the additional physical isolation required that further reduces the coupling coefficient between the primary and secondary windings.

In accordance with an aspect of the present invention, a power supply for a video display apparatus comprises an input voltage source, a switch and a transformer. The transformer has at least a first winding that develops a first voltage with respect to a first reference potential. The winding is coupled to the input voltage source and to the switch. A second transformer winding develops a second voltage with respect to a second reference potential. A feedback circuit develops a feedback signal with respect to the first reference potential, and is coupled to the switch for regulating the second voltage. The feedback circuit comprises a first feedback arrangement that develops a first portion of the feedback signal and is coupled to the switch and a second feedback arrangement that develops a second portion of the feedback signal and is coupled to the switch. The first and second portions of the feedback signal control the conduction of the switch to regulate the second voltage.

Figure 2:
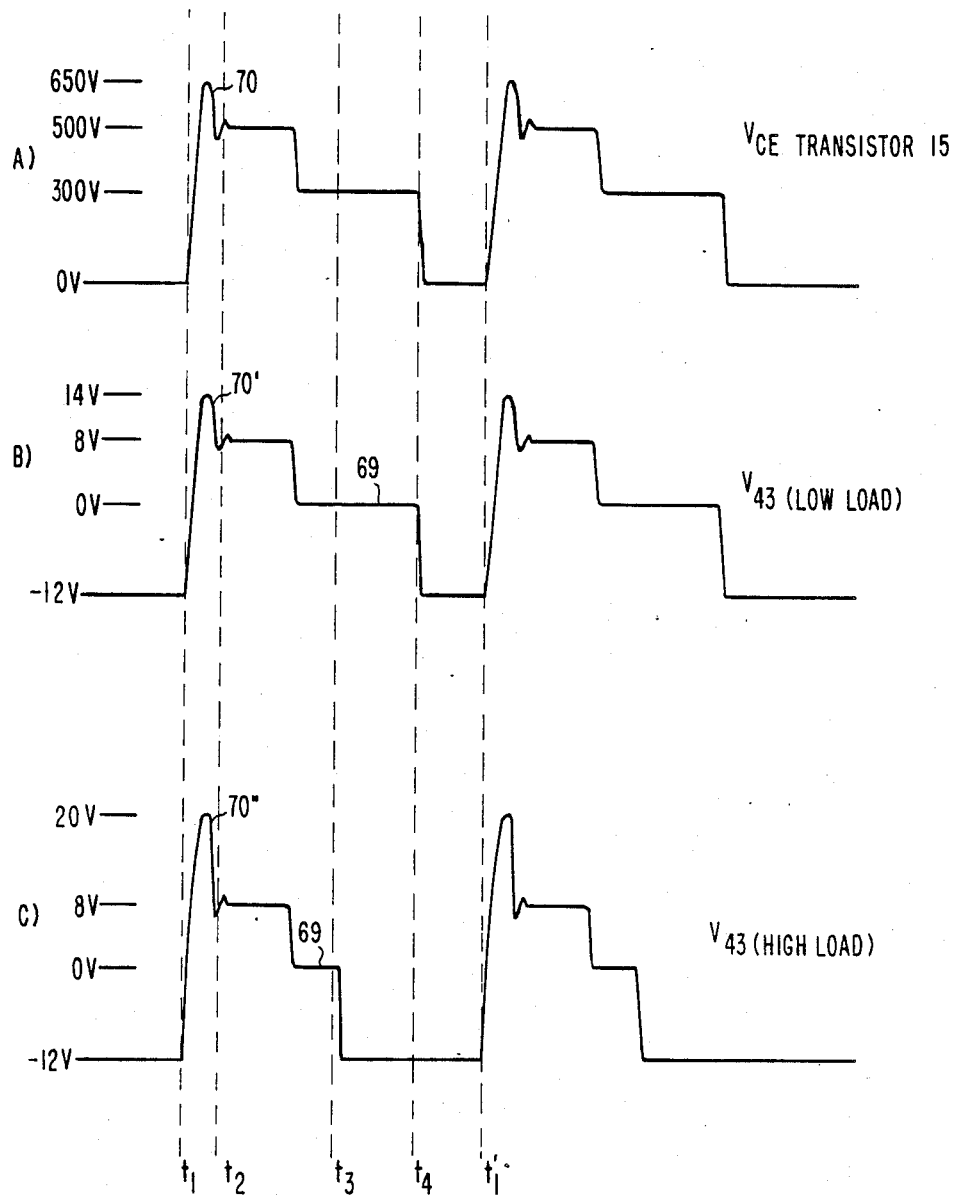

In the accompanying drawing,

FIG. 1 is a schematic and block diagram of a portion of a video display apparatus incorporating a switched mode power supply in accordance with an aspect of the present invention; and FIG. 2 illustrates waveforms useful in understanding the operation of FIG. 1.

In the video display apparatus of FIG. 1, the AC voltage produced by AC power source 10 is rectified by a rectifying circuit 11 and filtered by a capacitor 12 to provide a source of unregulated DC voltage. This DC voltage is applied to one terminal of a primary winding 13 of a power transformer 14. The other terminal of winding 13 is connected to the collector of a switching transistor 15. Conduction of transistor 15 causes current to flow, thereby developing a voltage across winding 13, which by transformer action causes voltages to be developed across secondary windings 17, 18 and 20 when transistor 15 is switched off.

The voltage developed across winding 17 is rectified by diode 21 and filtered by capacitor 22 to produce a DC voltage illustratively of the order of +5 volts that may be used to provide power to an external device, such as a computer.

The voltage developed across winding 18 is rectified by diode 23 and filtered by capacitor 24 to produce a DC voltage that illustratively provides power to horizontal deflection circuit 25. Horizontal deflection circuit 25 produces deflection current, via terminals H and H', in a horizontal deflection winding 26 located on the neck of a cathode ray tube (CRT) 27 in order to deflect the electron beams produced by the electron gun assembly 28 of CRT 27. Horizontal deflection circuit 25 illustratively produces retrace pulses which are applied to conventional high voltage generating circuitry 30 to produce the high voltage or ultor potential that is applied to ultor terminal 31 of CRT 27.

The voltage developed across winding 20 is rectified by diode 32 and filtered by capacitor 33 to produce a DC voltage that illustratively provides power to vertical deflection circuit 34 and to chrominance and luminance processing circuitry 35. Vertical deflection circuit 34 produces vertical deflection current, via terminals V and V', in vertical deflection winding 36, also located on the neck of CRT 27. Chrominance and luminance processing circuitry 35 produces the red, green and blue color drive signals that are applied to electron gun assembly 28 of CRT 27 via conductors designated 40. The color drive signals are illustratively produced in response to red, green and blue video signals (R, G, B) provided by a computer, for example, via user-accessible terminals designated 41.

It is necessary that the user-accessible terminals 41, and any other user accessible terminals, such as might be associated with audio circuits, be electrically isolated from the AC power source 10, which is typically the AC line supply. This electrical isolation is defined as an impedance between the isolated components of such a magnitude that the maximum current that can flow between the components is below a predetermined level. The voltages developed with respect to components or circuitry associated with the AC power source 10 are therefore referenced to a first reference potential, so-called "hot" ground, while the voltages developed with respect to the components or circuitry associated with the user-accessible terminals are referenced to a second reference potential, so-called "cold" or chassis ground.

In the circuit of FIG. 1, the previously described electrical isolation is provided by transformer 14, which incorporates sufficient physical separation and insulating material to meet the appropriate isolation requirements as specified, for example, by Underwriters Laboratories. The components and circuitry coupled to winding 13 are referenced to "hot" ground and are shown having a particular ground symbol, illustratively designated 65 in FIG. 1. The components and circuitry coupled to windings 17, 18 and 19 are referenced to "cold" ground and are shown as having a different ground symbol, illustratively designated 66 in FIG. 1.

As previously described, the switching flyback voltage developed when transistor 15 is nonconductive acts to develop voltages across windings 17, 18 and 20. It is desirable for proper operation of the load circuits connected to these windings that the voltage produced are carefully regulated with respect to the AC line voltage. Regulation may be readily maintained by controlling the conduction angle or duration of switching transistor 15 which in turn determines the magnitude of the voltages developed across windings 17, 18 and 20. The conduction of transistor 15 is controlled by a pulse width modulated base drive switching signal from regulator control circuit 42. In a conventional switched mode power supply, the control circuit will receive a feedback signal from one of the secondary regulated windings. In the circuit of FIG. 1, however, the electrical isolation provided by transformer 14 prevents the direct coupling of a feedback signal from one of the regulated "cold" windings 17, 18 or 20 to the "hot" control circuit 42. Coupling of this nature requires an additional isolating component, such as a transformer or an optocoupler, which increases the cost and complexity of the circuitry.

In accordance with an aspect of the present invention, winding 43 develops a sample voltage in response to the conduction of transistor 15 which is referenced to the AC voltage source reference potential, or "hot" ground. The voltage developed across primary winding 13, shown as the collector-emitter voltage of transistor 15 in FIG. 2A, is closely tracked by the sample voltage developed across winding 43, shown in FIG. 2B, due to the close magnetic coupling between windings 13 and 43. A first signal characteristic of the voltage across winding 43 is rectified by a diode 44 and filtered by a capacitor 45 to produce a DC voltage, essentially equal to the voltage level 69 of FIG. 2B, at a terminal 46. This DC voltage provides the supply voltage for the operation of the switched mode power supply regulator control circuit 42. The DC voltage at terminal 46 is also applied to the feedback terminal 50 of control circuit 42 via resistors 51, 52 and variable resistor 53 to form the first component of a regulator control feedback signal. This feedback signal is used to control the conduction duration of transistor 15 to maintain regulated voltages across windings 17, 18, 20 and 43.

The physical winding separation and insulation of transformer 14 necessary to satisfy electrical isolation requirements results in significantly less than perfect coupling between the "hot" windings 13 and 43, and the "cold" windings 17, 18 and 20. Therefore, under heavy circuit loading conditions, such as when an external computer is powered from the +5 V supply developed by winding 17, or when circuit loading abruptly changes, such as when the previously described computer is switched off or on, secondary winding voltage changes across windings 17, 18 and 20 caused by these circuit loading conditions may not be accurately represented by the voltage changes that occur across winding 43 and otherwise reflected by the feedback signal produced by action of diode 44 and and capacitor 45. Although decreasing or increasing changes in the regulated "cold" voltage levels will cause corresponding decreases or increases in the voltage across winding 43, these changes may not track the regulated windings' voltage changes sufficiently close to maintain the desired degree of regulation. In accordance with a novel aspect of the present invention, the circuit of FIG. 1 incorporates a rectifying diode 54 and a filter capacitor 55, coupled to winding 43, which produce a DC feedback voltage in response to a second signal characteritstic of the voltage across winding 43 that is applied to feedback terminal 50 via a resistor 56 and resistors 52 and 53 to form a second component of the feedback signal. The first and second feedback signal components are derived as follows.

At the time that transistor 15 is rendered nonconductive, times $t_1$ and $t_1'$ as shown in FIG. 2A, energy previously stored in winding 13 and the magnetically permeable core of transformer 14 is transferred to windings 17, 18 20 and 43 to develop their associated voltages. Since this energy transfer is not instantaneous, the collector voltage of transistor 15 increases between times $t_1$ and $t_2$ to form the voltage spike 70 shown in FIG. 2A. This voltage spike also appears as the voltage spike 70' as a component of the voltage $V_{43}$ developed across winding 43, as shown in FIG. 2B. The magnitude of the voltage at the collector of transistor 15 is limited by an energy snubbing circuit comprising resistor 60 and capacitor 61 in order to protect transistor 15 from large voltage stresses. The magnitude of the voltage spike will, however, be influenced by the amount of energy stored in winding 13, which is determined by the conduction angle or interval of transistor 15. Under low circuit loading conditions, transistor 15 will conduct between times $t_4$ and $t_1'$, as shown in FIG. 2B. Under heavy or increasing circuit loading conditions, such as may occur when operating a computer from the +5 volt supply associated with winding 17, the conduction angle of transistor 15 is increased, so that transistor 15 is conductive between times $t_3$ and $t_1'$, as shown in FIG. 2C. The magnitude of the developed voltage signal correspondingly increases between times $t_1$ and $t_2$, as shown by voltage spike 70" in FIG. 2C. The charging time constant of capacitor 55 is selected to be much faster than the charging time constant of capacitor 45 such that the voltage across capacitor 55 is representative of the peak voltage between times $t_1$ and $t_2$, the time of occurence of the voltage spike. In other words, the voltage across capacitor 55 is representative of the magnitude of the voltage spike 70' or 70". During heavy circuit loading conditions, therefore, the feedback circuit comprising diode 54 and capacitor 55 will provide an increased DC voltage level to feedback terminal 50 of control circuit 42. This second feedback signal component, when combined with the first feedback signal component derived from the feedback circuit comprising diode 44 and capacitor 45, provides a composite feedback signal that increases the conduction interval of transistor 15 to maintain load circuit voltage regulation that may not otherwise be possible with only a single feedback arrangement. A decrease in circuit loading will result in a corresponding decrease in the level of the second feedback signal component derived by diode 54 and capacitor 55, thereby decreasing the conduction angle of transistor 15. Capacitor 45 is selected to enable sufficient current to be provided to operate control circuit 42 while maintaining a substantially constant DC voltage across capacitor 45 when transistor 15 is not conducting. The values of resistors 51 and 56 are selected to balance the effect of the two feedback signal components to provide accurate voltage regulation under all circuit loading conditions. Varibale resistor 53 is adjusted to set the level of the regulated voltages.

Diode 44 and capacitor 45, and diode 54 and capacitor 55 are illustratively shown as being coupled to winding 43. Diode 44 and capacitor 45 could be coupled to a separate winding through diode 54 and capacitor 55, provided the two windings are tightly coupled to winding 13.

The previously described power supply therefore provides electrical isolation for the load circuits without the use of additional isolating components.

What is claimed is:

1. A power supply for a video display apparatus comprising:
   a source of input voltage;
   switching means;
   a transformer comprising:
   a first winding coupled to said source of input voltage and to said switching means; and
   a second winding coupled to a load;
   a control circuit coupled to said switching means for controlling the on-off state of said switching means for developing a first AC voltage across said first winding and a second AC voltage across said second winding for supplying power to said load, the switching of said switching means developing a voltage spike component of said first AC voltage that varies in accordance with the amount of power supplied to said load;
   first feedback means coupled to said control circuit and responsive to said first AC voltage for regulating said second AC voltage;
   second feedback means coupled to said control circuit for varying the condition interval of said switching means in accordance with variations of said voltage spike component for improving said regulation of said second AC voltage.

2. The arrangement defined in claim 1, wherein said first winding is electrically isolated from said second winding.

3. A power supply for video display apparatus comprising
   a source of input voltage;
   switching means;
   a transformer comprising:
      a first winding coupled to said source of input voltage and to said switching means; and
      a second winding coupled to a load;
   a control circuit coupled to said switching means for controlling the on-off state of said switching means for developing a first AC voltage across said first winding and a second AC voltage across said second winding for supplying power to said load, the switching of said switching means developing a voltage spike component of said first AC voltage that varies in accordance with the amount of power supplied to said load;
   first feedback means coupled to said control circuit and responsive to said first AC voltage for regulating said second AC voltage; and
   second feedback means coupled to said control circuit and responsive to variations of said voltage spike for controlling the switching of said switching means for improving said regulation of said second AC voltage, said first and second feedback means coupled to a third winding for developing a feedback signal in response to a sample voltage developed across said third winding, said sampled voltage being developed in response to said first AC voltage.

4. The arrangement defined in claim 3 wherein said first and third windings are electrically isolated from said second winding.

5. A power supply for a video display apparatus comprising:
   a source of unregulated voltage;
   switching means;
   a transformer comprising:
      at least a first transformer winding for developing a voltage with respect to a first reference potential, said first transformer winding coupled to said source of unregulated voltage and to said switching means;
      at least a second transformer winding for developing a voltage with respect to a second reference potential; and a third transformer winding for developing a sample voltage signal with respect to said first reference potential;
   a feedback circuit for coupling a feedback signal derived from said sample voltage signal to said switching means comprising:
      first feedback means embodying a first charging time constant for deriving a first portion of said feedback signal from a first signal characteristic of said sample voltage signal indicative of the average value of said sample voltage signal; and
      second feedback means embodying a second charging time constant shorter than said first charging time constant for deriving a second portion of said feedback signal from a second signal characteristic of said sample voltage signal indicative of the peak value of said sample voltage signal, said first and second portions of said feedback signal combining to form said feedback signal for controlling the conduction of said switching means such that said developed voltage of said second transformer winding is regulated with respect to said source of unregulated voltage.

6. A flyback-type power supply for a video display apparatus comprising:
   a source of unregulated voltage;
   switching means;
   a transformer comprising;
      at least a first transformer winding for developing a voltage with respect to a point of first reference potential electrically nonisolated from said source of unregulated voltage, said first transformer winding coupled to said switching means and responsive to the switching of said switching means for developing said voltage;
      at least a second transformer winding responsive to said switching of said switching means for developing a voltage with respect to a point of second reference potential electrically isolated from said point of first reference potential; and a third transformer winding electrically isolated from said point of second reference potential responsive to said switching of said switching means for developing a sample voltage signal with respect to said point of first reference potential;

a feedback circuit for coupling a feedback signal derived from said sample voltage signal to said switching means comprising:

first feedback means for deriving a first portion of said feedback signal from a first signal characteristic of said sample voltage signal during a first conduction interval of said switching means; and second feedback means for deriving a second portion of said feedback signal from a second signal characteristic of said sample voltage signal during said first conduction interval of said switching means, said first and second portions of said feedback signal combining to form said feedback signal for controlling the conduction of said switching means such that said developed voltage of said second transformer winding is regulated with respect to said source of unregulated voltage.

7. A power supply for a video display apparatus comprising:

a source of input voltage;

switching means capable of being switched between first and second conductive states;

a transformer comprising:

at least a first transformer winding coupled to said source of input voltage and to said switching means for developing a first voltage with respect to a first reference potential; and at least a second transformer winding for developing a second voltage with respect to a second reference potential, electrically isolated from said first reference potential;

a feedback circuit coupled to said switching means comprising:

a third transformer winding electrically isolated from said second transformer winding;

first feedback means, coupled to said third transformer winding and to said switching means for developing a first feedback signal portion from the voltage signal developed across said third transformer winding when said switching means couples one of said first and second conductive states; and second feedback means, coupled to said third transformer winding and to said switching means for developing a second feedback signal portion from said voltage signal developed across said third transformer winding when said switching means occupies said one of said conductive states, said first and second feedback signal portions combining the conduction of said switching means for regulating said second voltage.

8. The arrangement defined in claim 7, wherein said first feedback means comprises a rectifier and filter having a first time constant and said second feedback means comprises a rectifier and filter having a second time constant substantially less than said first time constant.

9. A power supply for a video display apparatus comprising:

a source of input voltage;

switching means;

a transformer comprising:

at least a first transformer winding for developing a first voltage with respect to a first reference potential, said first transformer winding coupled to said source of input voltage and to said switching means; and at least a second transformer winding for developing a second voltage with respect to a second reference potential;

a feedback circuit for developing a feedback signal coupled to said switching means for regulating said second voltage, said feedback signal having voltage levels developed with respect to said first reference potential, said feedback circuit comprising:

first feedback means comprising a rectifier and filter having a first time constant for developing a first portion of said feedback signal, coupled to said switching means; and second feedback means comprising a rectifier and filter having a second time constant substantially less than said first time constant, for developing a second portion of said feedback signal, said feedback circuit coupled to said switching means, said first and second portions of said feedback signal controlling the conduction of said switching voltage, said rectifier of said first feedback means rectifying a first voltage component developed across a feedback transformer winding, said first voltage component remaining substantially constant independent of circuit loading.

10. The arrangement defined in claim 9, wherein said rectifier of said second feedback means rectifies a second voltage component developed across a feedback transformer winding, said second voltage component comprising a voltage spike.

11. The arrangement defined in claim 10, wherein said voltage spike magnitude increases in response to increasing circuit loading.

12. The arrangement defined in claim 11, wherein said second portion of said feedback signal increases in response to increasing voltage spike magnitude.

13. The arrangement defined in claim 10, wherein the output of said first and second feedback means is resistively summed to develop said feedback signal.

* * * * *

UNITED STATES PATENT AND TRADEMARK OFFICE
CERTIFICATE OF CORRECTION

PATENT NO. : 4,658,342

DATED : April 14, 1987.

INVENTOR(S) : James H. Wharton

It is certified that error appears in the above-identified patent and that said Letters Patent is hereby corrected as shown below:

Column 8, line 1, after "combining" insert -- to form a feedback signal for controlling --

Signed and Sealed this

Twelfth Day of April, 1988

Attest:

DONALD J. QUIGG

Attesting Officer

Commissioner of Patents and Trademarks